United States Patent [19]

Guiver et al.

[11] Patent Number: 4,797,457

[45] Date of Patent: Jan. 10, 1989

[54] PREPARATION OF SUBSTITUTED POLYSULFONES THROUGH ORTHO-METALATED INTERMEDIATES

[75] Inventors: Michael D. Guiver; John W. ApSimon; Oleh Kutowy, all of Ottawa, Canada

[73] Assignee: National Research Council of Canada, Ottawa, Canada

[21] Appl. No.: 923,211

[22] Filed: Oct. 27, 1986

[30] Foreign Application Priority Data

Oct. 29, 1985 [CA] Canada .................................. 494160

[51] Int. Cl.$^4$ ............................................. C08G 65/40
[52] U.S. Cl. ..................................... 525/534; 528/171; 528/174
[58] Field of Search ......................................... 525/534

[56] References Cited

U.S. PATENT DOCUMENTS

| | | | |
|---|---|---|---|
| 3,230,198 | 1/1966 | Meyers | 528/171 |
| 3,748,306 | 7/1973 | Khattab | 528/174 |
| 3,789,052 | 1/1974 | Klebe et al. | 525/390 |
| 3,875,096 | 4/1975 | Graefe et al. | 528/174 |
| 4,086,209 | 4/1978 | Hara et al. | 528/125 |
| 4,414,368 | 11/1983 | Coplan et al. | 525/534 |
| 4,474,932 | 10/1984 | Bier et al. | 528/174 |
| 4,517,354 | 5/1985 | D'Alelio | 528/171 |
| 4,520,067 | 5/1985 | Harris et al. | 525/534 |
| 4,625,000 | 11/1986 | Chao et al. | 525/534 |

Primary Examiner—Harold D. Anderson
Assistant Examiner—Frederick Krass
Attorney, Agent, or Firm—Francis W. Lemon

[57] ABSTRACT

Novel substituted aromatic polysulfones are disclosed which contain repeating units of the formula:

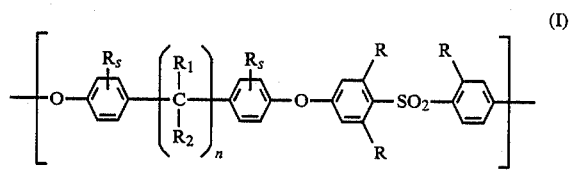

wherein each R represents hydrogen or a substituent, such as an aliphatic or aromatic substituent, a heteroatom or heteroatom-containing group or a metal-containing group, at least one of the groups R being other than hydrogen in some repeating units of the polymer chain, $R_1$ and $R_2$ each represents alkyl or aryl, each $R_s$ is the same or different and represents hydrogen or one or more noninterfering substituents, and n is zero or one. The substituted polysulfones (I) are useful materials which exhibit improved or modified physical, mechanical and chemical properties, such as glass transition temperature, hydrophilicity, lipophilicity, solubility, processability or resistance to chemicals. Also disclosed are processes for the preparation of the novel compounds (I) involving lithiated intermediates.

33 Claims, No Drawings

PREPARATION OF SUBSTITUTED POLYSULFONES THROUGH ORTHO-METALATED INTERMEDIATES

BACKGROUND OF THE INVENTION (1) Field of the Invention

This invention relates to novel aromatic polysulfones, including polysulfone ionomers and other derivatives, and to processes for their preparation involving the formation of novel metalated polymer intermediates. The polymers exhibit improved or modified properties, which can be tailored to a desired end use by controlling the nature and degree of derivitization. The invention thus also relates to the use of the modified polysulfones, for example, for forming membranes, fibres, films, sheets and solid structures.

(2) Discussion of the Prior Art

Polysulfones are a very stable class of polymers. However, the molecule generally lacks any usable functionality, rendering polysulfones useful only for applications in which their hydrophobic unreactive state is of advantage, for example in pipes and molded forms, as well as ultrafiltration and reverse osmosis membrane supports.

Hitherto, it appears that only one type of polysulfone has been lithiated. J. M. J. Frechet, M. J. Farrall and C. G. Willson report in Applied Polymer Science Proceedings, 46, pg. 335-9 (1981) that aliphatic poly(alkene sulfones) were subjected to lithiation. However, considerable chain degradation occurred, with the molecular weight of the product being about seven times lower than that of the starting polymer.

The modification of aromatic polymers by lithiation has been reported, for example, in U.S. Pat. No. 3,402,144 (Allan S. Hay) where polyphenylene ethers were metalated with alkali metal alkyls or aryls to give activated alkali metal-containing polymers. U.S. Pat. No. 3,639,337 (Johann F. Klebe) discloses conversion of poly-(2,6-diphenyl-1,4-phenylene oxide) to a copolymer by metalating the meta position of some of the phenylene rings and reacting the metalated product with carbon dioxide, an aryl aldehyde or a diaryl ketone to produce polymers still retaining the high temperature characteristics of the poly(2,6-diphenyl)-1,4-phenylene oxide) but having the added property of moldability.

SUMMARY OF THE INVENTION

It is an object of the present invention to provide polysulfone derivatives having improved or modified chemical and physical properties, such as glass transition temperature, hydrophilicity, hydrophobicity, lipophilicity, dyeability, solubility or corrosion resistance, which may be suitable, for example, for forming membranes, sheets, films, fibres, or solid structures.

Accordingly, one aspect of the present invention provides an aromatic polysulfone derivatives containing repeating units of the formula:

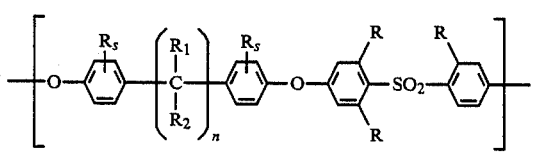
(I)

wherein each R is ortho to the sulfone, at least on R per polymer chain is, an aliphatic or aromatic substituent, a heteroatom or heteroatom-containing group or a metal or metal-containing group, with any remainder thereof being hydrogen; $R_1$ and $R_2$ each represent lower alkyl or aryl; each $R_s$ hydrogen and n is zero or one. Preferably, the degree of derivitization on the polysulfone is from about 0.01 to about 3 non-hydrogen groups R on average per repeating unit.

DETAILED DESCRIPTION OF THE INVENTION

Each repeating unit contains eight $R_s$.

A preferred group of aromatic polysulfones contain repeating units of formula I, wherein each R is ortho to the sulfone, at least one R per polymer chain is, alkyl, alkyl-aryl, aryl, alkylthio, arylthio, allyl, carboxyl, carboxylic ester, —COOM' (where M' is a metal or ammonium), hydroxyl-containing substituent, a group of the formula —C(OH)$R_3R_4$ (wherein $R_3$ and $R_4$ each represents hydrogen, alkyl or aryl), metal, metal-containing group, halogen-, sulfur-, phosphorus-, boron- or nitrogen-containing group, thiol, sulfonyl, halogen, a group of the formula —SiR'R"R'" or —SnR'R"R'" (wherein R', R" and R'" each represents hydrogen, alkyl or aryl), or an amide, substituted amide, imide, substituted imide, imine, amine, substituted amine, acyl or substituted acyl group, with any remainder thereof being hydrogen, $R_1$ and $R_2$ are each alkyl; each $R_s$ is hydrogen; and n is zero or one, the degree of derivitization on the polysulfone being from about 0.01 to about 3 non-hydrogen groups on average per repeating unit.

Another preferred group of the aromatic polysulfones contain repeating units of formula I, wherein n is zero or one; each $R_s$ is hydrogen; $R_1$ and $R_2$ each represents lower alkyl; and each R is ortho to the sulfone, at least one R per polymer chain is alkyl, alkylthio, arylthio, allyl, carboxyl, carboxylic ester, —COOM' (wherein M' is a metal atom, e.g. an alkali metal, or ammonium), thiol, nitro, sulfonyl, sulfonate, halogen, a group of the formula —C(OH)$R_3R_4$ (wherein $R_3$ and $R_4$ each represents hydrogen, alkyl or aryl), a group of the formula —SiR'R"R'" or —SnR'R"R'" (wherein R', R" and R'" each represents hydrogen, alkyl or aryl), or an amide, substituted amide, imide, substituted imide, imine, amine, substituted amine, acyl or substituted acyl group, lithium or other alkali metal, with any remainder thereof being hydrogen.

A particularly preferred group of compounds of the invention are the carboxylate-type polysulfone ionomers which find use as membranes in electrolytic cells, as ion exchange membranes and in ion exchange columns, namely compounds of formula I wherein at least one of the groups R per polymer molecule represents carboxyl, carboxylic ester, or —COOM', wherein M' is a metal or ammonium ion, particularly those in which about 0.01 to 1 of the groups R per repeating unit represent carboxyl or —COOLi, and the remaining group R represents hydrogen.

However, a diverse range of useful products falling within formula I can be obtained by virtue of the high reactivity of the metalated polymer carbanion intermediate with a large number of electrophiles, such as aldehydes, ketones, isocyanates, disulfides, nitriles, sulfur, sulfur dioxide, halogens and halogen-containing molecules, epoxides, amides, aldimines, thioisocyanates, anhydrides, alkyl halides, aryl-alkyl halides, thiiranes, nitrogen oxides, metal halides, non-metal halides, organometallic halides and borates among others. For example, the reaction of a carbanion with an aldehyde or ketone gives an alcohol which increases the hydrophilicity and wettability of the polymer. This property is very useful in membrane and separator science where the hydrophilicity of a polymer can be adjusted to give optimum results.

Another group of derivatives of the invention are those polymers containing repeating units of formula I, wherein the groups R represent methyl, ethyl, thiomethyl, —$CH_2SCH_3$, —$SO_2H$, halogen, —$SiR'R''R'''$, —$SnR'R''R'''$, allyl or imine.

Another aspect of the invention provides a process for preparing an aromatic polysulfone derivative containing repeating units of the formula:

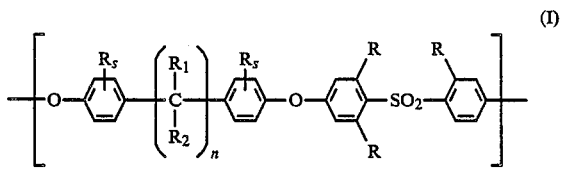

wherein R, $R_1$, $R_2$, $R_s$, n and the degree of derivitization are as defined above, which comprises lithiating a polysulfone containing repeating units of the formula:

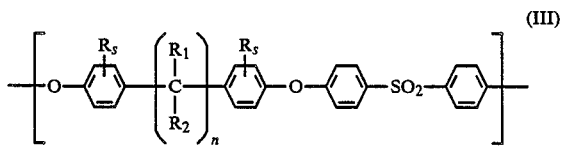

so as to form a lithiated polymer intermediate containing repeating units of the formula:

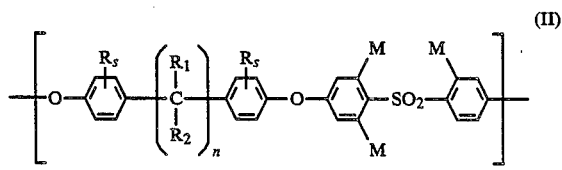

wherein each M represents hydrogen or lithium with at least one of the repeating units containing at least one lithium atom, and quenching the lithiated product with an electrophile so as to replace lithium by a desired substituent whereby to obtain a derivative of formula I.

In carrying out the process of the invention, the starting polymer is conveniently dissolved or suspended in a solvent, for example tetrahydrofuran, ether, hexane, dimethyl ethylene glycol or other suitable solvent. The solvent is not critical but should be substantially unreactive with the metalating agent and substrate. The reaction is carried out under anhydrous conditions and at a temperature of about 0° C. or below, using a metalating agent, such as an organolithium compound, for example an alkyl or aryl lithium, particularly n-butyllithium, sec-butyllithium, isobutyllithium, tert-butyllithium, methyllithium, ethyllithium, propyllithium, phenyllithium or lithium diisoproylamide, amongst others. Conveniently, the reaction will be carried out under an inert atmosphere, such as argon or nitrogen. The temperature of about 0° C. appears to be an approximate upper limit for useful lithiation of most polymers, since above this temperature, while metalation probably takes place, competing reactions tend to occur, with formation of a precipitated insoluble product. Thus, for example, if the solution is cooled to 0° C. and the metalating agent is added too rapidly, the heat of reaction causes the temperature to rise and precipitate the polymer. Temperatures below —78° C. (i.e. the temperature of dry ice/methanol) have not been tested, although it is believed likely that lithiation would still readily occur.

If desired, the lithiation reaction rate can be enhanced by the addition of a coordinating agent or catalyst, such as tetramethylethylenediamine (TMEDA), hexamethylphosphoric triamide (HMPT) or other tertiary amines.

The lithiated polymer intermediate is thereafter quenched with a suitable electrophile for the purpose of replacing lithium atomsby the desired functional group.

A large number of different electrophiles may be employed in this reaction step to form the desired derivatives, including aldehydes such as acetaldehyde, propionaldehyde, butyraldehyde and benzaldehyde; ketones such as diemthyl ketone, methyl ethyl ketone, diethyl ketone, diphenyl ketone and methol phenyl ketone; isocyanates such as methyl or ethyl isocyanate, and phenyl isocyanate, thioisocyanates such as methyl thioisocyanate, ethyl thioisocyanate, phenyl thioisocyanate, disulfides such as dimethyl disulfide, diethyl disulfide, methyl ethyl disulfide and diphenyl disulfide; nitriles such as benzonitrile and acetonitrile; carbon dioxide; sulfur; sulfur dioxide; halogens such as chlorine, bromine and iodine; halogen-containing compounds such as alkyl halides, e.g. iodomethane, iodoethane, chloromethane, chloroethane, bromomethane and bromoethane, aryl alkyl halides, e.g. benzyl chloride and bromide and allyl halides, e.g. allyl iodide and allyl bromide; epoxides such as ethylene oxide and propylene oxide; amides such as dimethylacetamide; organometallic halides such as chlorotrimethyl tin, chlorotrimethyl germane and chlorotrimethyl silane; metallic halides such as silver bromide or cuprous bromide and non-metallic halides such as chlorodiphenylphosphine.

For example, quenching with iodomethane gives rise to a methylated polymer derivative, while the use of aldehydes and ketones gives rise to hydroxy-containing polymers with enhanced hydrophilicity. Quenching with carbon dioxide results in the production of carboxylate-containing ionomers from which carboxylic acids or esters may be obtained by further reaction.

The lithiated intermediates are also novel polymers as are other metalated products. Accordingly, the invention also provides a metallated aromatic polysulfone derivative containing repeating units of the formula:

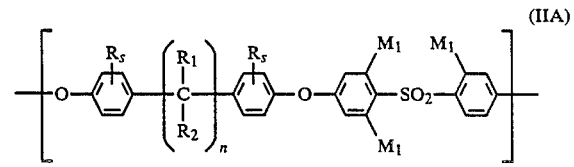

wherein each $M_1$ is ortho to the sulfone, at least one $M_1$ per polymer chain is lithium, sodium or potassium, there being at least one $M_1$ in the overall polymer chain in the form of a metal atom, with any remainder thereof being hydrogen, and $R_1$, $R_2$, $R_s$ and n are as defined above.

The invention further provides a lithiated aromatic polysulfone derivative containing repeating units of the formula:

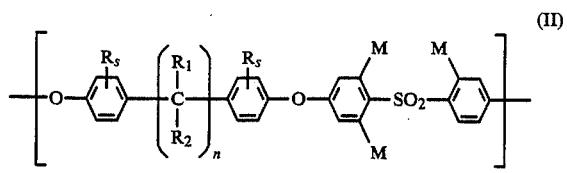

wherein each M is ortho to the sulfone at least one $M_1$ per polymer chain is or lithium, with any remainder thereof being hydrogen, and $R_1$, $R_2$, $R_s$ and n are as defined above. Generally, the degree of lithiation is from about 0.01 to about 3 atoms of lithium per repeating unit.

The metalation or lithiation can be carried out as described above. Suitable lithiating agents are given above. In general, metalation can be effected using an organoalkali metal compound, such as butylsodium.

In a preferred embodiment of the invention, a Udel ® Polysulfone which contains per molecule about 10 to 150 repeating units, preferably about 50 to 80 repeating units, of the formula:

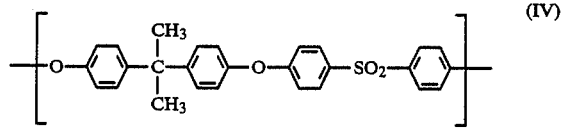

is readily lithiated up to the level of about two equivalents of lithium, for example, mono- or dilithiation per repeating unit of the polymer, within minutes of addition of a desired amount of a metalating agent, for example n-butyllithium. The temperature range suitable for this reaction to occur was found to be in the range of from about 0° C. down to the dry ice/methanol temperature (−78° C.), and preferably from about −30° C. to −70° C. Temperatures below −78° C. have not been tested although it is likely that lithiation would occur. The temperature of 0° C. appears to be the practical upper limit since above this temperature precipitation occurs resulting in an insoluble product. For example, if the solution is cooled to 0° C. and the metalating agent is added too rapidly, the heat of reaction causes the temperature to rise and precipitate a polymer.

Lower temperatures of about −70° C. are specific to mono or dilithiation and no substantial reaction beyond dilithiation occurs within a reasonable time. Trilithiation generally requires a somewhat higher reaction temperature, such as −30° C. to 0° C.

Udel Polysulfones have been lithiated by the above technique in ¼ mol equivalent increments from ¼ to 2 mol equivalents at −70° C. The extent of lithiation was monitored by treating the lithiated polymer intermediates with suitable electrophiles (either iodomethane or deuterium oxide) and analyzing the products by NMR spectroscopy.

Based on the NMR analysis, the product obtained by lithiation using 2 mol equivalents of butyllithium, followed by quenching with iodomethane was dimethylated Udel Polysulfone containing repeating units essentially of the formula:

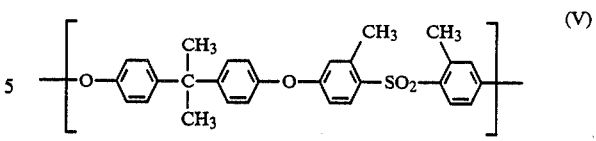

Similarly, quenching of the dilithiated product with deuterium oxide gave dideuterated Udel polysulfone containing repeating units essentially of the formula:

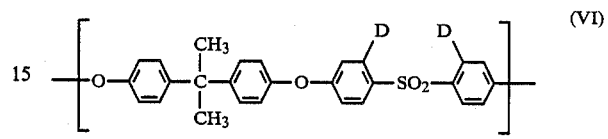

When 1 mol equivalent of n-butyllithium was reacted with Udel Polysulfone and then quenched with deuterium oxide, NMR analysis indicated an average of about one deuterium atom per repeating unit ortho to the sulfone linkage.

It appears that a mixture of mono and dilithiation of the aryl-sulfone repeat unit occurs simultaneously when less than 1 mol equivalent of n-butyllithium are used. When ¼ mol equivalent of n-butyllithium is reacted with polysulfone and then quenched with iodomethane, monomethylation per repeat aryl-sulfone unit is observed almost exclusively. As the degree of methylation increases and eventually approaches 1 mol equivalent, a mixture of mono and dimethylation is observed.

However, even small amounts of lithiation as low as the minimum of one lithium atom per polymer molecule, give rise to property modification of the polysulfone following derivitization and are intended to be included within the invention.

While the lithiation of Udel Polysulfone occurs rapidly and substantially quantitatively with n-butyllithium, with methyllithium it appears to react more slowly. When 2 mol equivalents of methyllithium were used at −70° C. approximately 67% dilithiation was observed after 60 minutes. When the reaction was analyzed after 300 minutes an increase in this ratio was observed. It appears that the reaction rate of methyllithium with Udel Polysulfone is slower than that of n-butyllithium.

Phenyllithium was also found to be an effective lithiating agent for Udel polysulfone. Reactions at a higher temperature of −30° C. led to a more completely metalated product than at −70° C. It can be expected that all alkyl and aryl lithiums will work well. Lithium amides such as lithium diisopropylamide (LDA) also metalate Udel polysulfone to some degree, but appar to be less effective than alkyl and aryl lithium reagents.

As mentioned above, dilithiation of Udel Polysulfone occurs rapidly after the addition of n-butyllithium in the temperature range of −70° C. to 0° C. At temperatures above −70° C., a slow trilithiation reaction can occur. A small degree of trilithiation is observed at −50° C. At higher temperatures of −30° C., with 3 or 3.3 mol equivalents of n-butyllithium, about 40–75% trilithiation occurs after 2-3 hours. If 4 mol equivalents of n-butyllithium are used at −30° C., a tri-substituted product is observed after 90 minutes. Using 3.3 mol equivalent at 0° C., a tri-substituted product is observed after 1 to 2 hours. As the reaction progresses from the dilithiated to the trilithiated species the reaction mixture becomes very viscous and may become a gelatinous solid. Appropriate stirring means should be employed to ensure homogeneity of the reaction mixture, for example a mechanical stirrer.

In the NMR spectrum, the integration of the arylmethyl signals relative to the dimethyl signal of the Bisphenol-A portion indicates that the trimethylated polymer has a repeating structure mainly of the formula:

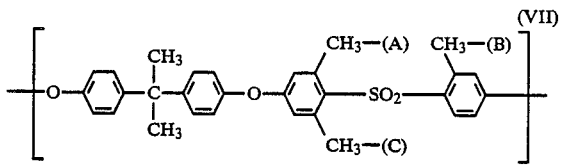

As the increasing degree of trimethylation is monitored by NMR spectroscopy, Methyl (A) and Methyl (B) which were equivalent, become non-equivalent and Methyl (A) and Methyl (C) now become equivalent.

In the above lithiation-derivitization reactions, substitution on the polymers occurs almost entirely ortho to the sulfone group with only trace amounts of substitution elsewhere.

Obtained polymers with substituents ortho to the sulfone linkage and containing benzylic hydrogens (such as dimethylated Udel polysulfone in which $R_5=R_6=H$), can be further reacted with metalating agents to effect a second stage of derivitization. Thus, following ortholithiation and derivatization, a product obtained which contains repeating units essentially of the formula:

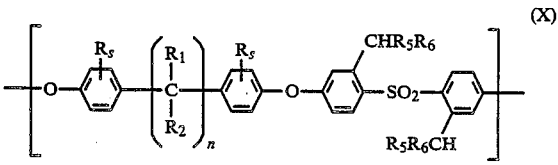

wherein $R_1$, $R_2$, $R_s$ and n are as defined above and $R_5$ and $R_6$ each represents hydrogen or an aliphatic or aromatic group or other non-interfering substituent, with up to two $CHR_5R_6$ groups being present per polymer repeating unit, can be lithiated to form a product containing repeating units predominantly of the formula:

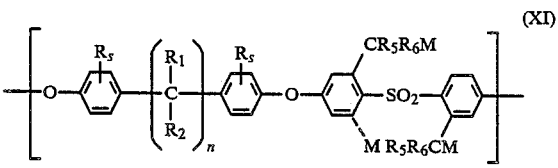

where each M is hydrogen or lithium, with at least one lithium atom being present in the overall polymer chain. Lithiation takes place preferentially on the benzylic hydrogen atoms of groups —$CHR_5R_6$. Thereafter, excess lithiation occurs ortho to the sulfone group, as before, as shown by group M joined by a broken line. The resulting product can be reacted with an electrophile to produce a derivative predominantly of the formula:

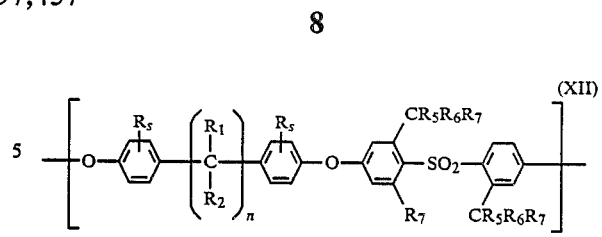

wherein $R_7$ is hydrogen, an aliphatic or aromatic group, a heteroatom or heteroatom-containing group, or a metallic or organometallic group, with at least one $R_7$ in the overall polymer being other than hydrogen. The process can be repeated if $R_5$ or $R_6$ was originally hydrogen to introduce further substitution on the benzylic carbon atom.

Thus, the reaction of the dimethylated Udel polysulfone discussed above with 2 mol equivalents of n-butyllithium at −70° C. led immediately to a deep blood-red lithiated species which was quenched with iodomethane after 30 minutes. NMR analysis of the product indicated that lithiation occurred almost entirely at the methyl groups, ortho to the sulfone group, with a small amount of ring lithiation ortho to the sulfone linkage. The reaction sequence was thus as follows:

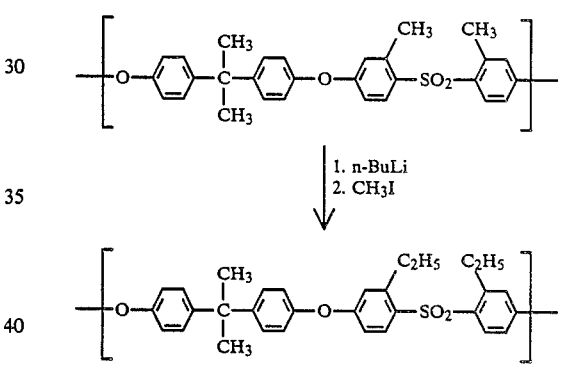

In another embodiment, dimethyl Udel Polysulfone was lithiated and the reaction product was quenched with the electrophile dimethyl disulfide.

Based on NMR analysis, the product appeared to have the repeating structure, with a small degree of ring thiomethylation:

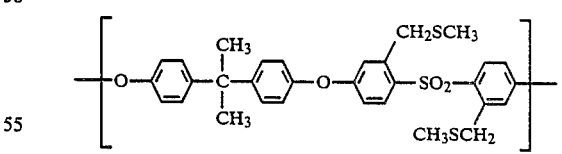

These metalated polymer carbanion intermediates may also be reacted with a large variety of electrophiles such as those mentioned previously.

In another embodiment of the invention Radel ® Polysulfone which contains repeating units of the formula:

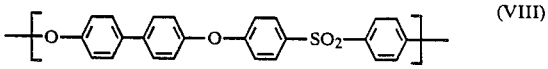

was lithiated. The difference in structure lies in the presence of an aryl-aryl linkage instead of the presence of an isopropylidene linkage giving a Bisphenol-A structure, thereby making Radel Polysulfone a completely aromatic polymer.

Radel Polysulfone was dilithiated at both −40° C. and −70° C. utilizing procedures similar to those described above for Udel Polysulfone. In the methylated product, NMR analysis indicates dimethylation ortho to the sulfone linkage, namely a repeating structure essentially of the formula:

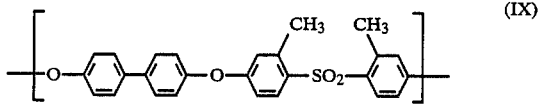

(IX)

Lithiated Radel polysulfone may also be reacted with the larger number of electrophiles such as those mentioned previously.

A wide range of additional novel polymers can be derived from lithiated polysulfones, for example Udel, Radel and others, pursuant to the process of the invention. For example, the metalated polymers can be reacted with virtually any electrophile, including, for example, aldehydes, ketones, quinones, carbon dioxide, epoxides, esters, lactones, anhydrides, nitriles, alkyl halides, aryl-alkyl halides, alkyl sulfates, organometallic halides, other halogen-containing compounds, such as metallic halides and non-metallic halides, borates, amides, thiiranes, nitrogen oxides, isocyanates, isothiocyanates, phenyl hydrazones, nitroso compounds, oxygen, sulfur, disulfides, sulfinates, carbon disulfide, sulfur dioxide, sulfonyl halides, selenium, tellurium, halogens, among others.

For example, the reaction of a metalated polysulfone with an aldehyde or ketone gives an alcohol which greatly increases the hydrophilicity and wettability of the polymer. This property is very useful in membrane and separator science where the hydrophilicity of a polymer can be adjusted to give optimum results.

The following non-limitative Examples illustrate the invention.

In the Examples, Udel 3500 Polysulfone was prepared in fibrous form from commercial pellets by dissolving the polymer in CH$_2$Cl$_2$ and precipitating it into isopropanol in a Waring blender. The precipitated polymer was dried in a vacuum oven for 24 hours at 100° C. and then 24 hours at 130° C. This is not a limiting or critical mode of procedure, but simply more convenient when operating experimentally on a small scale.

All glassware and apparati were dried in an oven at 130° C. overnight prior to use. Reactions were performed under an inert atmosphere, in this instance argon which had been passed through a silica gel tower. The reaction vessel was equipped with a drying tube or gas bubbler, gas inlet, thermocouple, septum and a magnetic or mechanical stirrer.

The solvent, in this case tetrahydrofuran (THF), was dried by refluxing over lithium aluminum hydride (LAH) and under argon for at least 1 hour and then freshly distilled for each reaction.

All reagents, such as the lithiation agents and the electrophiles were used as purchased without further purification or verification of concentration.

The extent of lithiation was monitored by reacting samples of the lithiated polymer with iodomethane (MeI) and analyzing the results by Nuclear Magnetic Resonance (NMR) spectroscopy. The methylated polymers were dissolved in deuterochloroform (CDCl$_3$) unless otherwise specified and the spectra were recorded on a Varian EM-360 60 MHz NMR Spectrometer. The chemical shifts are expressed in parts per million and the spectral resonances are designated: singlet (s), doublet (d), triplet (t), quartet (q), multiplet (m). n-Butyllithium, methyllithium, phenyllithium and lithium diisopropylamide were purchased commercially.

The derivatized polymers were recovered by precipitation into isopropanol or methanol or any other suitable non-solvent, filtered and then treated with water or alcohol. The polymers were dried in a vacuum or convection oven at 120° C. overnight.

Some polymer samples were purified by redissolving in THF or CHCl$_3$ and precipitation into alcohol.

DESCRIPTION OF THE PREFERRED EMBODIMENTS

The following Examples 1–8 serve to define the extent of reaction of n-butyllithium with Udel Polysulfone under different reaction conditions. The extent of lithiation was monitored by spectroscopic measurements on the stable methyl and deuterium derivatives. Examples 9–12 demonstrate that other lithiating agents also give suitable results. Examples 13–15 and 19 show that other types of polysulfones can also be lithiated and derivatized. Examples 16–29 illustrate the utility of the lithiation and derivatization procedure by showing the diversity of polymers obtainable by reaction of the lithiated polymers with several types of electrophiles.

EXAMPLE 1

Lithiation of UDEL 3500 Polysulfone with 2 mol equivalents of n-Butyllithium at −30° C.

Udel Polysulfone equivalent weight=442 grams per mole repeat unit

Udel 3500 Polysulfone (2.00 g, 0.0045 mol) was dissolved in THF (75 mL) and the temperature of the solution was reduced to −30° C. n-Butyllithium (2 mol equiv. 0.009 mol, 3.48 mL of 2.6M in hexane) was added dropwise over 12 minutes, during which time the mixture turned a red-brown colour. The polymer was methylated after 30 minutes by the slow addition of iodomethane and then precipitated into alcohol, washed and finally dried.

Spectral analysis indicated that the reaction was complete within 30 minutes and that the product contained repeating units of the formula:

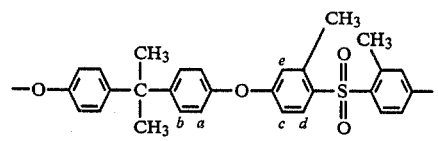

NMR: δ=1.71 s (6H) (2-Me-isopropylidene) δ=2.30 s (6H) (Aryl-methyl) δ=6.80(s) (H-e), δ=6.88(d) J≈9 Hz (H-c), δ=6.96(d) J≈9 Hz (H-a) δ=7.26(d) J=9 Hz (H-b), δ=8.12(d) J≈9 Hz (2H, H-d)

EXAMPLE 2

Lithiation of UDEL 3500 Polysulfone with 2 mol equivalents of n-Butyllithium at −50° C.

Udel 3500 Polysulfone (2.20 g, 0.005 mol) was dissolved in THF (75 mL) and the temperature of the solution was reduced to −50° C. n-Butyllithium (2 mol equiv. 0.01 mol, 3.85 mL of 2.6M in hexane) was added dropwise over 12 minutes. Iodomethane was added to the lithiated polymer after 30 minutes. NMR spectral analysis indicated that the polymer was dimethylated as in Example 1.

EXAMPLE 3

Lithiation of UDEL 3500 Polysulfone with 2 mol equivalents of n-Butyllithium at −70° C.

Udel 3500 Polysulfone (4.42 g, 0.01 mol) was dissolved in THF (150 mL) and the clear solution was cooled to −70° C. by placing the flask in a dry ice/alcohol bath at −78° C.

n-Butyllithium (2 mol equiv. 0.02 mol, 2.0 mL of 10.2M in hexane) was added over a period of three minutes. Samples of the resulting clear red solution were withdrawn and quenched with iodomethane at the following time intervals and at −70° C.

| A. 0 minutes | B. 5 minutes |
|---|---|
| C. 15 minutes | D. 30 minutes |

Spectral analysis demonstrated that the dimethylation reaction (and therefore the dilithiation reaction) was essentially complete between 5 and 15 minutes at −70° C.

EXAMPLE 4

Lithiation of UDEL 3500 Polysulfone with 2 mol equivalents of n-Butyllithium at Room Temperature Udel 3500 Polysulfone (2.20 g, 0.005 mol) was dissolved in THF (75 mL) and n-Butyllithium (2 mol equiv. 0.01 mol, 3.85 mL of 2.6M in hexane) was added dropwise. The solution turned to a red-brown colour after the first few drops and after 1 mL a deep red solution and precipitate formed. After 11 minutes, all the lithiating reagent had been added and MeI was added immediately to the red-brown precipitate. An exothermic reaction ensued and the colour of the mixture gradually faded to give a white precipitate which was insoluble in THF and chloroform.

EXAMPLE 5

Lithiation of Polysulfone with 2 mol equiv. of n-Butyllithium at 0° C.

To a magnetically stirred solution of Udel Polysulfone (2.2 g, 0.005 mol) in THF (75 mL) at 0° C. was added n-Butyllithium (2 mol eq, 0.01 mol, 1.0 mL of 10.2M) over a period of 5 minutes. During this time the temperature in the reaction flask increased to 6° C. The clear red solution was stirred for an additional 5 minutes and then quenched with D$_2$O.

Dideuteration occurred ortho- to the sulfone linkage as shown by a decrease in the integration of signal area H-d (δ=7.85) in the NMR spectrum. A minor signal at δ=7.85 between the split signal H-d indicates a trace amount of deuteration also occurs at H-c. The product contained repeating units mainly of the formula:

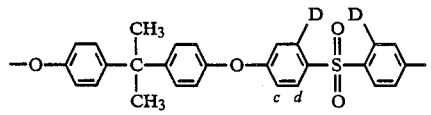

EXAMPLE 6

Lithiation of Polysulfone with 4 mol equiv. n-Butyllithium at −30° C.

Udel 3500 Polysulfone (4.4 g, 0.01 mol) was dissolved in THF (150 mL) and cooled to −70° C. n-Butyllithium (4 mol eq, 0.04 mol, 4.0 mL of 10.2M in hexane) was added dropwise via syringe to the mechanically stirred solution over a period of 10 minutes and the solution was allowed to warm up to −30° C. After 30 minutes at this temperature the red solution became more viscous and effective stirring was more difficult. The polymer solution progressively became less soluble and eventually precipitated as one mass. The reaction was terminated by addition of iodomethane after 3 hours. NMR analysis of the reaction product indicated that Udel 3500 polysulfone was trimethylated in positions ortho to the sulfone linkage and the product contained repeating units of the formula:

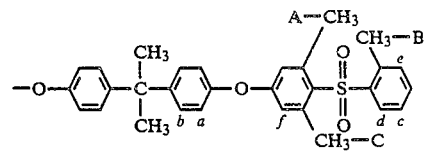

NMR: δ=1.70(s), 6H(2-CH$_3$-isopropylidene), δ=2.27(s), 3H(CH$_3$-B), δ=2.48(s), 6H(2-CH$_3$-A & C), δ=6.67(s), (H-f) δ=6.81(s) (H-e), δ=6.84(d), (H-c), δ=6.95(d), 4H(H-a), δ=7.25(d), 4H(H-b), δ=7.96(d), 1H(H-d).

A sample of the lithiated polymer solution was also quenched with deuterium oxide.

NMR: δ=1.70(s), 6H(2-Me-Isopropylidene), δ=6.91(d), (H-a), δ=7.00(s), (overlies one H-a doublet signal, H-e, H-f), δ=7.24(d), (H-b), δ=7.84(d) 1H(H-d), δ=7.84(s) minor signal from collapse of double H-d attributed to minor deuteration at H-c.

The position of deuterium incorporation was identical to that of methyl uptake in this example thus confirming the site of lithiation. The polymer contains repeating units of the formula:

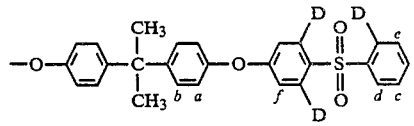

EXAMPLE 7

Lithiation of Polysulfone with 3.3 mol equiv. of n-Butyllithium at 0° C.

n-Butyllithium (3.3 mol equiv., 0.0165 mol, 1.6 mL of 10.5M in hexane) was added dropwise to a mechanically stirred solution of Udel 3500 Polysulfone (2.2 g, 0.005 mol) in THF (75 mL) at 0° C. over a period of 7 minutes. The solution precipitated soon after the addition and samples were withdrawn at 1 and 2 hours and quenched with Iodomethane. The NMR spectrum of the polymer indicated >95% completion after 1 hour and 100% trilithiation after 2 hours.

EXAMPLE 8

Lithiation of Polysulfone with 3 mol equiv. of n-Butyllithium at −50° C.

Udel Polysulfone (2.2 g, 0.005 mol) was dissolved in THF (75 mL) and cooled to −50° C. n-Butyllithium (3 mol equiv, 0.015 mol, 1.5 mL of 10.2M in hexane) was added dropwise via syringe to the mechanically stirred solution over a period of three minutes. After 2 hours, the red solution was quenched with iodomethane and the polymer recovered in the usual manner. NMR analysis of the product indicated that only a small degree of tri-lithiation had occurred.

EXAMPLE 9

Lithiation of Udel Polysulfone with 2 mol equiv. of Methyllithium at −70° C.

Methyllithium (2 mol equiv. 0.01 mol, 7.2 mL of 1.4M in ether) was added dropwise to a solution of Udel Polysulfone (2.2 g, 0.005 mol) in THF (75 mL) at −70° C. over a period of 10 minutes. The lime green polymer solution was quenched with iodomethane after 60 minutes and recovered by precipitation into methanol. The NMR spectrum showed that the reaction was 67% complete based on the ratio of the integration of the methyl signals vs the methyl signals of the Bisphenol-A segment.

Another similar reaction reached 75% completion after 300 minutes reaction time.

EXAMPLE 10

Lithiation of Udel Polysulfone with 2 mol equiv. of Phenyllithium at −70° C.

Phenyllithium (2 mol equiv. 0.01 mol, 5.5 mL of 1.8M in cyclohexane/diethyl ether) was added dropwise to a solution of Udel Polysulfone (2.2 g, 0.005 mol) in THF (75 mL) at −70° C. over a period of 20 minutes. The mixture was stirred for 250 minutes before addition of iodomethane. Comparison of the integration of the methyl signals with the isopropylidene signal in the NMR spectrum indicated approximately 80% dimethylation.

EXAMPLE 11

Lithiation of Polysulfone with 2 mol equiv. of Phenyllithium at −30° C.

Phenyllithium (2 mol equiv. 0.01 mol, 5.5 mL of 1.8M in cyclohexane/diethyl ether) was added dropwise to a solution of Udel Polysulfone (2.2 L g, 0.005 mol) in THF at −30° C. After 175 minutes, iodomethane was added to the mixture and the polymer was recovered by precipitation into methanol.

The dimethylation was approximately 93% complete as indicated by comparison of the integration of the methyl signals against the isopropylidine signal in the NMR spectrum.

EXAMPLE 12

Lithiation of Udel Polysulfone with Lithium Diisopropylamide (LDA)

LDA (0.01 mol) was added to a stirred solution of Udel Polysulfone (2.2 g, 0.005 mol) in THF (75 mL) at −70° C. Iodomethane was added to the viscous red-brown mixture after 90 minutes. Following recovery of the polymer, the NMR spectrum showed incorporation of an average of one methyl group per three repeating polymer units.

Another experiment at −40° C. produced the same result.

A further experiment at −70° C. where hexamethyl-phosphoric triamide (HMPT) was included produced a polymer with the same percentage of derivation but which appeared more viscous in solution.

EXAMPLE 13

Lithiation of RADEL Polyphenylene Ether Sulfone with 2 mol equivalents of n-Butyllithium at −40° C.

Radel Equivalent weight=400 grams per mol repeat unit

Radel Polyphenylene Ether Sulfone (2.00 g, 0.005 mol) was dissolved in THF (75 mL) and the solution was cooled to −40° C. Some of the polymer remained swollen and not completely dissolved as a homogenous solution. n-Butyllithium (2 mol equiv. 0.01 mol, 3.85 mL of 2.6M in hexane) was added over a period of 13 minutes during which time polymer precipitated from solution. After 1 hour, iodomethane was added and the mixture was stirred for 1 hour. The mixture was precipitated into isopropanol and treated in the usual manner to give a dimethylated product containing repeating units of the formula:

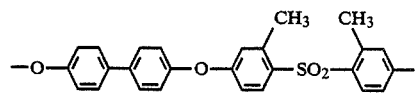

EXAMPLE 14

Lithiation of Radel Polysulfone with 2 mol equiv. of n-Butyllithium at −70° C.

Radel Polysulfone (2.00 g, 0.005 mol) was dissolved in THF (75 mL) and cooled to −70° C. To the mechanically stirred solution was added n-Butyllithium (2 mol equiv. 0.01 mol, 1.0 mL of 10.5M) dropwise during which time a light orange/brown colour developed. Iodomethane was added after 20 minutes and the polymer recovered by precipitation. NMR analysis of the product indicated that the dimethylation of Radel Polysulfone was essentially complete.

NMR: $\delta=2.34(s)$, 6H, (ring methylation), $\delta=6.84(s)$ (H-e), $\delta=7.08(d)$, (H-a), $\delta=7.57(d)$ 4H (H-b), $\delta=8.12(d)$ 2H (H-d). A diminished H-c doublet is visible in the H-a doublet.

EXAMPLE 15

Lithiation of Dimethylated UDEL 3500 Polysulfone with 2 mol equivalents of n-Butyllithium at −70° C.

Dimethylated Polysulfone equivalent weight=470 grams per mol repeat unit

Dimethylated Polysulfone (2.20 g, 0.0047 mol) was dissolved in THF (75 mL) and the solution was cooled to a temperature of −70° C. n-Butyllithium (2 mol equiv. 0.0094 mol, 0.9 mL of 10.2M in hexane) was added over a period of 2 minutes. The colour of the solution immediately changed to clear deep red. After a further 3 minutes, a red precipitate had formed and then the reaction was quenched with Iodomethane. After recovery of the polymer, the NMR spectrum showed that the methyl groups had been preferentially lithiated and subsequently converted to ethyl groups. A minor amount of ring derivatization was also evident. The major product was diethylated Udel Polysulfone containing repeating units of the formula:

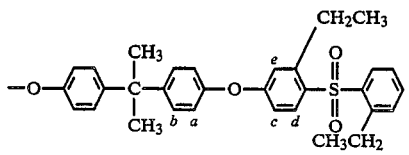

NMR: δ=0.92(t), 6H, J=7.2 Hz(CH₃CH₂ methylation of methyl group), δ=1.72(s), 6H(2-CH₃-Isopropylidene), δ=2.30(s) (minor signal, unreacted dimethyl-polysulfone), δ=2.44(s) (minor signal, unassigned), δ=2.49(s) (minor signal, ring methylation of dimethyl-polysulfone), δ=2.75 [q, J=7.2 Hz, 4H(CH₃CH₂)], δ=6.70-7.06 (H-a masked by H-c and H-e), δ=7.25 (d) 4H(H-b), δ=8.09(d) 2H(H-d).

EXAMPLE 16
Carbon Dioxide with Lithiated Udel Polysulfone

Carbon dioxide gas was passed through a solution of dilithiated Udel Polysulfone (0.005 mol) in THF at −50° C. The white water soluble polymer precipitate was dissolved in hot water and precipitated into dilute hydrochloric acid. The presence of the carboxylic acid groups was confirmed by titrating the polymer with sodium hydroxide and also by a broad absorption band at 2400–3600 cm⁻¹ (O—H stretch) and a strong absorption at 1735 cm⁻¹ (C=O stretch) in the infrared spectrum. The water insoluble dicarboxylic acid substituted polymer contained repeating units of the formula:

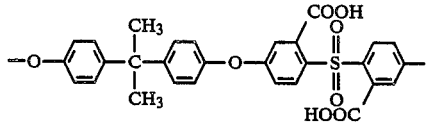

EXAMPLE 17
Carbon Dioxide with Lithiated Udel Polysulfone

To a mechanically stirred solution of Udel Polysulfone (22.1 g, 0.05 mol) in THF (500 mL) at −70° C. was added n-Butyllithium (0.5 mol equiv. 0.025 mol, 2.4 mL of 10.5M) by syringe. The solution was quenched with carbon dioxide by bubbling the gas through the mixture. After 30 minutes the white gel was precipitated into alcohol, boiled with water and finally washed with methanol before drying in a vacuum oven.

A film of the polymer in the Lithium Carboxylate Ionomer form was prepared from a solution of the polymer in N-methyl-2-pyrrolidinone (NMP). The presence of the carboxylate group was confirmed by an absorption band at 1687 cm⁻¹ (C=O) in the infrared spectrum.

In the lithium carboxylate form, the polymer is soluble in dimethyl sulfoxide (DMSO) and dimethyl acetamide (DMA), partly soluble in NMP and swells in dimethyl formamide (DMF). The polymer swells slightly in chloroform and THF and is water insoluble.

The salt form was converted to the carboxylic acid form by boiling the polymer with dilute hydrochloric acid. The polymer in the carboxylic acid form is soluble in NMP, DMA and DMF, partly soluble in DMSO and THF and insoluble in water.

The polymer had an average of one carboxylic acid or carboxylate salt group per two repeating units of Udel Polysulfone. A sheet of the modified polymer in both the acid and salt form displayed improved wetability and dyeability over unmodified Udel.

Methylene Blue (Basic Blue 9, C.I. 52015) dyed the modified polymers dark blue compared with light blue for Udel under the same conditions.

Basic Red 14 (Sevron) dyed the modified polymers deep red compared with pink for Udel under the same conditions.

EXAMPLE 18
Dimethyl Disulfide with Lithiated Udel Polysulfone

Dimethyl disulfide was added to a solution of dilithiated Udel Polysulfone (0.005 mol) in THF (75 mL) at −70° C. and the mixture stirred for 30 minutes and then the polymer was recovered by precipitation into methanol. The polymer displayed the following characteristics in the NMR spectrum: δ=1.70(s), 6H(2-Me-Isopropylidene), δ=2.27(s), 6H, (2-MeS), δ=6.60(s) and δ=6.64(s) (unassigned), δ=6.78(s) (H-e), δ=6.90(d) (H-a), δ=7.23(d) (H-b), δ=8.25(d) 2H (downfield shift H-d). The thiomethylated polymer contained repeating units of the following formula as the major product:

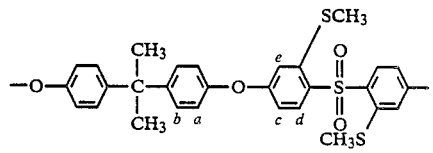

EXAMPLE 19
Dimethyl Disulfide with Lithiated Dimethyl-Udel Polysulfone

To a mechanically stirred solution of Dimethylated Udel Polysulfone (2.35 g, 0.005 mol) in THF (50 mL) at −70° C. was added n-Butyllithium (2 mol eq., 0.01 mol, 1.0 mL of 10.5M) dropwise. The deep-red mixture was stirred vigourously for 60 minutes after which time a dark rubbery paste had formed. Dimethyl Disulfide was added to the mixture and stirring was continued for a further 60 minutes. The polymer was recovered by precipitation and had the following characteristics in the NMR spectrum: δ=1.71(s) 6H(2-Me-Isopropylidene), δ=1.85(s) 6H(—CH₂—S—CH₃), δ=2.28 (minor broadened signal approx. 1H, unreacted methyl and/or ring thio-methylation), δ=3.82(s) 4(H) (downfield shift, —CH₂—S—CH₃), δ=6.93 (broadened doublet) H-a, δ=7.26 (broadened doublet) H-b, δ=8.09(d) H-d, remainder of aromatic protons masked by H-a and H-b. The thiomethylated polymer contained repeating units of the following formula as the major product:

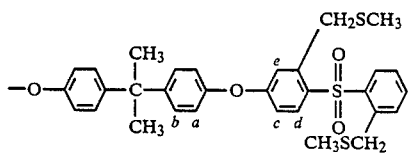

EXAMPLE 20

Acetone with Lithiated Udel Polysulfone

Acetone was added dropwise to dilithiated Udel polysulfone (0.005 mol) dissolved in THF (75 mL) at −70° C. A clear gel formed which had turned white after 15 minutes. The polymer was precipitated into alcohol, washed several times in alcohol and dried. An NMR spectrum gave the following: $\delta = 1.70$ singlet with shoulder, (12H, approximately 4 methyl groups), $\delta = 4.68$ and $\delta = 5.10$ (OH), $\delta = 6.52-7.45$ (12H, aromatic protons), $\delta = 7.60-8.20$ (3H, H-d). An infrared spectrum showed an absorption band at 3470 cm$^{-1}$ corresponding to O—H stretch.

The spectral data indicates that approximately 1 mol equivalent of acetone reacts with the lithiated polymer. The polymer contains an average of approximately one dimethyl carbinol group per repeating unit, most of which have the formula:

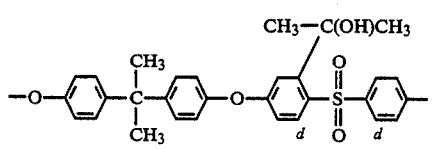

EXAMPLE 21

Benzophenone with Lithiated Udel Polysulfone

A solution of Benzophenone in THF was added slowly to a mechanically stirred solution of monolithiated Udel Polysulfone (0.05 mol) in THF (750 mL) at −70° C. After 5 minutes a thick translucent gel formed which was stirred for 2 hours at −30° C. and then precipitated into alcohol, washed in dilute hydrochloric acid, water and finally in alcohol (31.2 g, 91% yield). A transparent membrane prepared for IR analysis had an absorption band at 3410 cm$^{-1}$ corresponding to OH stretch.

An NMR spectrum revealed: $\delta = 1.68$(s) 6H (2-Me-isopropylidene), $\delta = 5.70$(s) (1-OH, D$_2$O exchangeable), $\delta = 6.39$(s) (possibly H-e,), $\delta = 6.78-7.28$ (m, benzophenone residue and other aromatic protons), $\delta = 7.75-8.16$ (three doublets, H-d J≃9 Hz).

Elemental Analysis:

| Calculated for C$_{40}$H$_{32}$O$_5$S | | |
|---|---|---|
| | Calculated | Found |
| C | 76.90 | 77.00 |
| H | 5.16 | 5.06 |
| S | 5.13 | 5.41 |

The polymer contains an average of one diphenyl carbinol group per repeating unit, some of which have the formula:

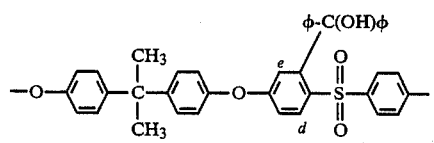

EXAMPLE 22

Benzaldehyde with Lithiated Udel Polysulfone

Benzaldehyde (4 mL in 8 mL of THF) was added dropwise to a stirred solution of dilithiated Udel Polysulfone (0.005 mol) in THF (75 mL) at −70° C. Upon completion of the addition and stirring for 20 minutes, the white gel was precipitated into alcohol, washed in alcohol and then dried in a vacuum oven.

Thin transparent films of the polymer prepared from both chloroform and THF for IR had an absorption band at 3520 cm$^{-1}$ corresponding to O—H stretch. The following signals were observed in the NMR spectrum: $\delta = 1.65$(s) 6H (2-Me-isopropylidene, upfield shift), $\delta = 3.42$ (broadened signal, possibly OH), $\delta = 6.40-6.56$ possibly benzylic proton, $\delta = 6.70-7.30$(m) (benzaldehyde residue and other aromatic protons), $\delta = 7.83-8.20$ (H-d). The polymer contains approximately two phenyl carbinol groups per repeating unit which are represented by the formula:

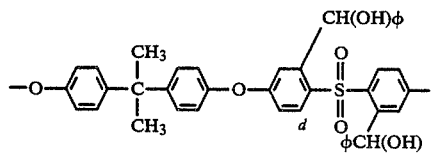

EXAMPLE 23

Iodine with Lithiated Udel Polysulfone

A solution of iodine in THF was added dropwise to a stirred solution of monolithiated Udel Polysulfone (0.005 mol) in THF at −30° C. A brownish gel formed which was stirred for one hour and then recovered by precipitation into methanol. The white iodinated polymer was dried at room temperature in vacuo.

Elemental Analysis:

| Calculated for C$_{27}$H$_{21}$O$_4$IS | | |
|---|---|---|
| | Calculated | Found |
| C | 57.05% | 60.42% |
| H | 3.72% | 3.88% |
| I | 22.32% | 19.04% |
| S | 5.64% | 6.81% |

The polymer contained repeating units mostly of the formula:

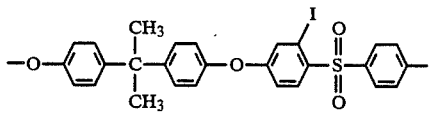

EXAMPLE 24

Allyl bromide with Lithiated Udel Polysulfone

Allyl bromide (2 mL) was added dropwise via syringe to a stirred solution of dilithiated Udel Polysulfone (0.005 mol) in THF at −30° C. The product was recovered by precipitation into alcohol after stirring for two hours. Evidence for an average of approximately one allyl group incorporated per repeating unit was seen in the NMR spectrum by a broad signal centered at δ=4.86 (olefinic protons). Some of the repeating units may be represented by the formula:

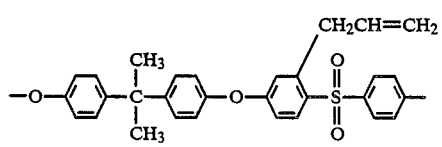

EXAMPLE 25

Sulfur dioxide with Lithiated Udel Polysulfone

Sulfur dioxide gas was bubbled into a solution of monolithiated Udel polysulfone (0.005 mol) at −30° C. The off-white precipitate was poured into a blender containing aqueous methanol and then acidified with dilute hydrochloric acid. The sulfinic acid containing polymer was dried at room temperature in vacuo.

Elemental Analysis:

| | Calculated for $C_{27}H_{22}O_6S_2$ | |
|---|---|---|
| | Calculated | Found |
| C | 64.01 | 63.51 |
| H | 4.38 | 4.18 |
| S | 12.66 | 12.20 |

The polymer contained repeating units mostly of the formula:

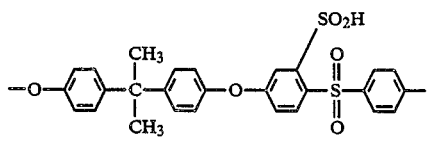

EXAMPLE 26

Benzonitrile with Lithiated Udel Polysulfone

Benzonitrile was added to a solution of monolithiated Udel (0.005 mol) in THF at −30° C. The resulting red pasty product was stirred for one hour and precipitated into alcohol giving a yellow imine containing product in 94% yield. In the infrared spectrum, an absorption at 3260 cm$^{-1}$ and at 1688 cm$^{-1}$ corresponding to N—H stretch an C≡N stretch respectively and a satisfactory elemental analysis supports the presence of an imine group.

Elemental Analysis:

| | Calculated for $C_{34}H_{27}O_4NS$ | |
|---|---|---|
| | Calculated | Found |
| C | 74.84 | 74.45 |
| H | 4.99 | 4.92 |
| N | 2.57 | 2.35 |
| S | 5.88 | 6.10 |

The polymer contained repeating units mostly of the formula:

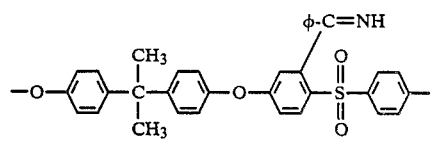

EXAMPLE 27

Trimethyltin Chloride with Lithiated Udel Polysulfone

A solution of trimethyltin chloride in THF was added dropwise to a solution of dilithiated Udel Polysulfone (0.005 mol) in THF at −30° C. and the product was recovered by precipitation after stirring at this temperature for three hours. In the NMR spectrum a major upfield sharp singlet at δ=0.33 together with three minor upfield signals showed that one to two trimethyltin groups per repeat unit were incorporated onto the polymer chain.

EXAMPLE 28

Trimethylsilylchloride with Lithiated Udel Polysulfone

Trimethylsilylchloride was added dropwise to a solution of dilithiated Udel (0.005 mol) in THF at −20° C. The colourless solution was stirred for 30 minutes, precipitated into alcohol and recovered in 97% yield. The integration of the trimethylsilyl signal at δ=0.33 in the NMR spectrum together with the elemental analysis suggests a polymer with repeating units of the following formula where the degree of disilylation amounts to 95%:

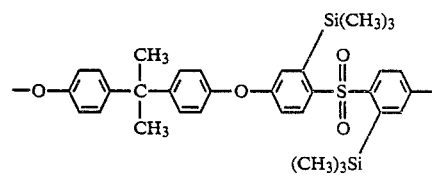

Elemental Analysis:

| | Calculated for $C_{33}H_{38}O_4SSi_2$ | |
|---|---|---|
| | Calculated | Found |
| C | 67.53 | 67.82 |
| H | 6.53 | 6.47 |
| S | 5.46 | 5.64 |

What is claimed is:

1. An aromatic polysulfone derivative containing repeating units of the formula:

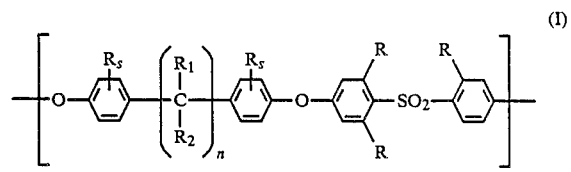

(I)

wherein each R is ortho to the sulfone, at least one R per polymer chain is an aliphatic or aromatic substituent, a heteroatom, heteroatom-containing group, metal or metal-containing group, with any remainder thereof being hydrogen; $R_1$ and $R_2$ each represent lower alkyl or aryl; each $R_s$ is hydrogen and n is zero or one.

2. An aromatic polysulfone derivative according to claim 1, wherein the degree of derivitization on the polysulfone is from about 0.01 to about 3 non-hydrogen groups on average per repeating unit.

3. An aromatic polysulfone derivative according to claim 1 which contains at least ten repeating units per molecule.

4. An aromatic polysulfone derivative according to claim 1, which contains from about 50 to about 80 repeating units.

5. An aromatic polysulfone derivative which contains repeating units of the formula:

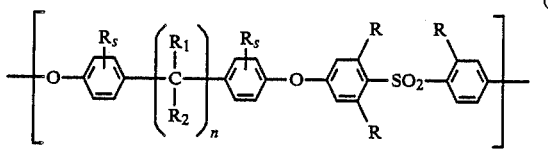

(I)

wherein each R is ortho to the sulfone, at least one R per polymer chain is alkyl, alkyl-aryl, aryl, alkylthio, arylthio, allyl, carboxyl, carboxylic ester, —COOM' (wherein M' is a metal or ammonium), hydroxyl-containing substituent, a group of the formula —C(OH)$R_3R_4$ (wherein $R_3$ and $R_4$ each represents hydrogen, alkyl or aryl), metal, metal-containing group, halogen-, sulfur-, phosphorus-, boron-, or nitrogen-containing group, thiol, sulfonyl, halogen, a group of the formula —SiR'R''R''' or —SnR'R''R''' (wherein R', R'' and R''' each represent hydrogen, alkyl or aryl), or an amide, substituted amide, imide, substituted imide, imine, amine, substituted amine, acyl or substituted acyl group, with any remainder thereof being hydrogen, $R_1$ and $R_2$ are each alkyl; each $R_s$ is hydrogen; and n is zero or one, the degree of derivitization on the polysulfone being from about 0.01 to about 3 non-hydrogen groups on average per repeating unit.

6. An aromatic polysulfone derivative which contains repeating units of the formula:

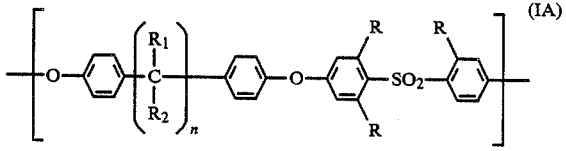

(IA)

wherein each R is ortho to the sulfone, at least one R per polymer chain is alkyl, alkylthio, arylthio, allyl, carboxyl, carboxylic ester, —COOM' (wherein M' is alkali metal or ammonium), thiol, sulfonyl, haolgen, a group of the formula —C(OH)$R_3R_4$ (wherein $R_3$ and $R_4$ each represents hydrogen, alkyl, or aryl), a group of the formula —SiR'R''R''' or —SnR'R''R''', (wherein R', R'' and R''' each represents hydrogen, alkyl or aryl), or an amide, substituted amide, imide, substituted imide, imine, amine, substituted amine, acyl or substituted acyl group, with any remainder thereof being hydrogen, $R_1$ and $R_2$ are each lower alkyl; and n is zero or one, the degree of derivitization on the polysulfone being from about 0.01 to about 3 non-hydrogen groups on average per repeating unit.

7. A polysulfone derivative according to claim 5 or 6 which contains at least ten of said repeating units per molecule.

8. A polysulfone derivative according to claim 5 or 6 which contains from about 50 to about 80 of said repeating units per molecule.

9. A polysulfone derivative according to claim 5 or 6 wherein said at least one R is selected from methyl, ethyl, thiomethyl, —CH$_2$SCH$_3$, —SO$_2$H, halogen, —SiR'R''R''', —SnR'R''R''', allyl and imine.

10. A polysulfone derivative according to claim 5 or 6 wherein said at least one R is or contains carboxyl, carboxylic ester or carboxylate.

11. A polysulfone derivative according to claim 5 or 6 wherein said at least one R is —C(OH)$R_3R_4$.

12. A polysulfone derivative according to claim 5 or 6 wherein $R_1$ and $R_2$ are both methyl and n is one.

13. A polysulfone derivative according to claim 5 or 6 wherein n is zero.

14. A metalated aromatic polysulfone derivative containing repeating units of the formula:

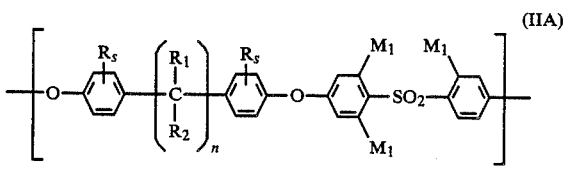

(IIA)

wherein each $M_1$ is ortho to the sulfone, at least one $M_1$ per polymer chain is lithium, sodium or potassium, there being at least one $M_1$ in the overall polymer chain in the form of a metal atom, with any remainder thereof being hydrogen, and $R_1$, $R_2$, $R_s$ and n are as defined in claim 1.

15. A lithiated aromatic polysulfone derivative containing repeating units of the formula:

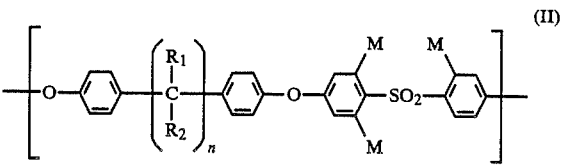

(II)

wherein each M is ortho to the sulfone, at least one M per polymer chain is lithium with any remainder thereof being hydrogen, and $R_1$, $R_2$ and n are as defined in claim 1.

16. A lithiated aromatic polysulfone according to claim 14 or 15, wherein the degree of lithiation is from about 0.01 to 3 atoms of lithium on average per repeating unit.

17. A lithiated aromatic polysulfone according to claim 14 or 15, wherein $R_1$ and $R_2$ each represents methyl and n is zero or one.

18. A lithiated aromatic polysulfone solution or suspension, comprising a polymer derivative as defined in claim 14 or 15 in an inert, anhydrous solvent and maintained in an oxygen-free anhydrous atmosphere.

19. An aromatic polysulfone derivative of the formula;

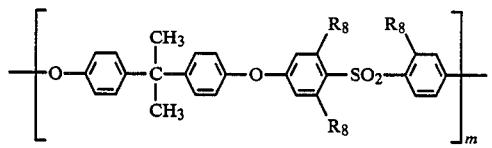 5

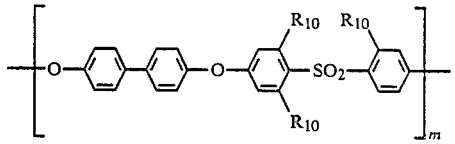

wherein m is an integer from about 10 to about 150 and each $R_8$ is ortho to the sulfone, at least one $R_8$ per polymer chain is methyl, ethyl, thiomethyl, —$CH_2SCH_3$, —$SO_2H$, halogen, —SiR'R''R''', —SnR'R''R''', allyl, imine or —C(OH)$R_3R_4$ with any remainder thereof being hydrogen, and $R_3$ and $R_4$ are as defined in claim 6.

20. An aromatic polysulfone derivative according to claim 19, wherein each $R_8$ which is other than hydrogen is an ortho-substituent and the degree of ortho substitution is on average from about 0.01 to about 3 per repeating unit.

21. An aromatic polysulfone derivative according to claim 20, wherein the degree of ortho-substitution is from about 1 to abut 2 per repeating unit.

22. An aromatic polysulfone derivative of the formula;

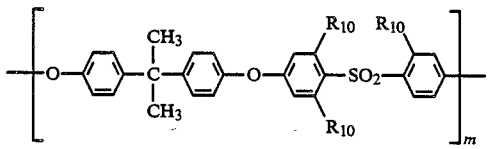

wherein m is an integer from about 10 to about 150 and each $R_{10}$ is ortho to the sulfone and at least one $R_{10}$ per polymer chain is carboxyl, carboxyl-containing group, carboxylate, carboxylate-containing group, carboxylic ester or ester containing group, with any remainder thereof being hydrogen.

23. An aromatic polysulfone derivative according to claim 22, wherein each $R_{10}$ which is other than hydrogen is an ortho-substituent, and the degree of orthosubstitution is on average from about 0.01 to 3 substituent groups per repeating unit.

24. An aromatic polysulfone derivative according to claim 23, which contains from about 0.1 to about 1 of the $R_{10}$ as ortho-substituents per repeating unit.

25. An aromatic polysulfone derivative of the formula:

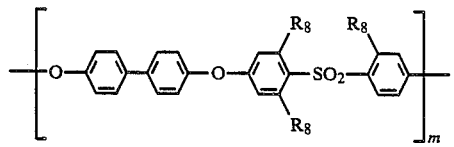

wherein m is an integer from about 10 to about 150 and each $R_8$ is ortho to the sulfone, and at least one $R_8$ per polymer chain is methyl, ethyl, thiomethyl, —$CH_2SCH_3$, —$SO_2H$, halogen, —SiR'R''R''', SnR'R''R''', allyl, imine or —C(OH)$R_3R_4$ with any remainder thereof being hydrogen, and $R_3$ and $R_4$ are as defined in claim 5.

26. An aromatic polysulfone derivative according to claim 25 wherein about 1 to about 2 of the $R_8$ per repeating unit are other than hydrogen.

27. An aromatic polysulfone derivative of the formula:

wherein m is an integer from about 10 to about 150 and each $R_{10}$ is ortho to the sulfone, and at least one $R_{10}$ per polymer chain is carboxyl, carboxyl-containing group, carboxylate, carboxylate-containing group, carboxylic ester or ester-containing group, with any remainder thereof being hydrogen.

28. An aromatic polysulfone derivative according to claim 27, wherein each $R_{10}$ which is other than hydrogen is an orthosubstituent and the degree of ortho-substitution is from about 0.1 to about 1 ortho-substituents per repeating unit.

29. An aromatic polysulfone derivative of the formula:

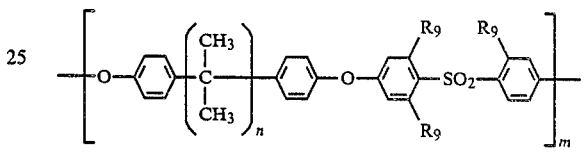

wherein n is zero or one, m is an integer from about 10 to about 150 and each $R_9$ is ortho to the sulfone and least one $R_9$ per polymer chain is iodine, thiomethyl, —$CH_2SCH_3$, dimethyl carbinol, diphenyl carbinol, phenyl carbinol, allyl, sulfinic acid, benzimide, trimethyltin or trimethylsilyl, with any remainder thereof being hydrogen.

30. An aromatic polysulfone derivative according to claim 29, wherein each $R_9$ which is other than hydrogen is an ortho-substituent, and the degree of orthosubstitution is on average from about 0.01 to about 3 substituent groups per repeating unit.

31. An aromatic polsulfone derivative according to claim 30, which contains from about 1 to about 2 of the said ortho-substituents per repeating unit.

32. A polysulfone derivative of the formula:

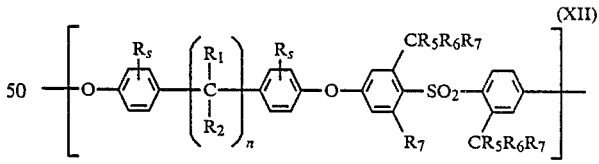 (XII)

wherein $R_1$, $R_2$, $R_s$ and n are as defined in claim 1, $R_5$ and $R_6$ each represents hydrogen or an aliphatic or aromatic group, and $R_7$ is hydrogen, an aliphatic or aromatic group, a heteroatom or heteroatom-containing group or a metallic or organometallic group, with at least one $R_5$, $R_6$ or $R_7$ group in the overall molecule being other than hydrogen.

33. A derivative according to claim 32, wherein $R_1$ and $R_2$ are each methyl, n is 1, at least one of $R_5$, $R_6$ and $R_7$ in the overall polymer chain is —COOH, —COOalkyl or —COOM', wherein M' is ammonium or alkali metal, and the degree of orthosubstitution is on average from about 0.01 to about 3 substituents per repeating unit.

* * * * *